United States Patent [19]
Giuffre et al.

[11] 3,835,124
[45] Sept. 10, 1974

[54] METHOD FOR THE PRODUCTION OF CAPROLACTAM AND ITS PRECURSORS BY FORMATION AND NITROSATION OF THE CYCLOPENTAMETHYLENE, KETENE-SO$_2$ ADDUCT AND PRODUCTS OBTAINED THEREBY

[75] Inventors: Luigi Giuffre, Milan; Giancarlo Sioli, Como; Roberto Mattone, Seveso, all of Italy

[73] Assignee: Snia Viscosa Societa Nazionale Industria Applicazioni Viscosa S.p.A., Milan, Italy

[22] Filed: Jan. 22, 1973

[21] Appl. No.: 325,563

[30] Foreign Application Priority Data
Jan. 27, 1972  Italy.................................. 19882/72

[52] U.S. Cl.. 260/239.3 A, 260/239 A, 260/293.86, 260/326.5 FN, 260/514 R, 260/566 A, 260/585.5, 260/647
[51] Int. Cl............................................. C07d 41/06
[58] Field of Search....... 260/239.3 A, 585.5, 566 A

[56] References Cited
UNITED STATES PATENTS
3,733,317  5/1973  Giuffre et al. ................ 260/239.3 A

OTHER PUBLICATIONS
Gomes et al. "J. Het. Chem." Vol. 6, pp. 729–734 (1969).

*Primary Examiner*—Henry R. Jiles
*Assistant Examiner*—Robert T. Bond

[57] ABSTRACT

A method for the preparation of omega lactams is disclosed, more particularly epsilon caprolactam or a precursor thereof (such as cyclohexanone oxime), using as the starting material a cyclomethylene ketene, with the simultaneous formation of side products such as cyclohexanecarboxylic acid, wherein an adduct is preliminarly formed between cyclomethylene ketene and sulphur dioxide. The adduct is then reacted with a nitrosating agent so as to obtain, under the appropriate reaction conditions, the expected lactam, more specifically epsilon caprolactam.

10 Claims, No Drawings

METHOD FOR THE PRODUCTION OF CAPROLACTAM AND ITS PRECURSORS BY FORMATION AND NITROSATION OF THE CYCLOPENTAMETHYLENE, KETENE-SO₂ ADDUCT AND PRODUCTS OBTAINED THEREBY

This invention relates to a method for the production of omega lactams, more particularly epsilon caprolactam, and their precursors or intermediates, such as cyclohexanone oxime, starting from the relative cyclomethylene ketenes, more particularly from cyclopentamethylene ketene (hereinafter indicated by the short symbol CPMK).

The preparation of omega-lactams and their lactamizable precursors has been heretofore proposed and described by Applicants in the U.S. Pat. application No. 51 268 filed on June 30, 1970, June Pat. No. 3,733,317, issued May 15, 1973 wherein there is described a process for the preparation of omega-lactams having the general formula:

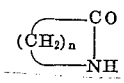

wherein $n =$ from 2 to 13, and/or of their lactamizable precursors, which may be cycloaliphatic oximes or cycloaliphatic nitroso derivatives, monomers or dimers characterized by the fact that the corresponding cyclomethylene ketene, having the general formula

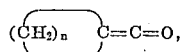

where $n$ has the aforementioned value, is subjected to nitrosation with a nitrosating agent of the formula NOX, where X can be -HSO₄, -Cl, -NO₂,-OR (in which R indicates an alkyl or aryl organic substituent), at a temperature comprised between −60°C and +100°C.

The preparation of several ketenes is known in the art, such as by thermal decomposition of acetone (U.S. Pat. No. 2 863 922), or by cracking acetic acid to ketene (U.S. Pat. No. 2 688 635). An advantageous method for the production of alicyclic ketenes, and new ketenes adapted for preparing omega-lactams therefrom, has been also heretofore proposed and described by Applicants in the U.S. Pat. application Ser. No. 118951 filed on Feb. 25, 1971 now abandoned, wherein there has been disclosed a method for the preparation of alicyclic ketenes, useful as intermediates in the preparation of lactams. Such proposed method consists in a heat treatment of an alicyclic acid, or its anhydride, in a metallic reactor exempt from nickel, at high temperatures but under subatmospherical pressures. A catalyst of the type $XP(OR)_3$ wherein X is selected from the group consisting of oxygen, sulphur and selenium and R is an alkyl radical is preferred for accelerating the reactions. The temperatures are in the range from 550°C to 750°C and the preferred pressure is under 100 millimeters of mercury.

It is therefore an object of the present invention to provide a method for producing omega-lactams and providing further important advantages and improvements over the prior art, including an improved efficiency of the control of the reaction with the nitrosating agent, more particularly with the nitrosulphuric acid, as well as the obtention of products having a high purity, side products have also a high purity and susceptible of being utilised with advantages, and lastly, with a negligible formation of undesirable by-products, more particularly volatile bases, said undesirable formation being qualitatively confined even to values not exceeding 0.1 percent of the end product.

Another object of the invention is to provide a method for the production of epsilon caprolactam, with a high yield and a high purity of the product or the precursors thereof, and the simultaneous formation, as a side product, of cyclohexanecarboxylic acid (or hexahydrobenzoic acid, hereinafter indicated with the abridged symbol AEB), also with purity and which can be utilized again as a starting material.

A further object of the invention is to provide a new and advantageous intermediate for the preparation of the desired epsilon-caprolactam. A still further object of this invention is a new method including the steps of preparing said new intermediate and then of reacting such intermediate with nitrosylsulphuric acid for producing epsilon-caprolactam.

A still other object of this invention is to provide a method including the steps controlledly causing the said intermediate to react with the said nitrosyl sulphuric acid and obtaining further intermediates and precursors of epsilon-caprolactam, such as cyclohexanone oxime, alpha nitroso cyclohexanecarboxylic acid and other nitrosated cyclical compounds.

According to the invention, there is provided a method for preparing omega-lactams, including the steps of forming an adduct between the ketene and SO₂, nitrosating said adduct and promoting by subsequent reactions the formation of the desired lactam or of a precursor thereof.

More particularly, the method comprises forming an adduct between cyclomethylene ketene, still more particularly cyclopentamethylene ketene, and SO₂, causing said adduct to react with nitrosylsulphuric acid to obtain a nitrosated adduct capable of giving, upon subsequent reactions, epsilon-caprolactam or a precursor thereof.

The possibility of obtaining an adduct of CPMK with SO₂, and of carrying out nitrosation, is not known, as far as the Applicants are aware nor that it had been considered susceptible of exploitation in the contemporary art.

Although a few recent studies have shown the possibility of formation of an adduct between "ketene" (CH₂=CO) and SO₂, the same studies made it conspicuous that other ketenes, such as dimethylketene, ethylbutylketene and biphenylketene, do not form any adduct with SO₂.

Consequently, it could not be foreseen, and, on the contrary, it was to be considered unlikely, any possibility of formation of the CPMK/SO₂ adduct.

According to the invention, this CPMK/SO₂ adduct can be obtained and isolated in different ways.

According to an embodiment of the invention, SO₂, in either liquid or gaseous form, is introduced into a solution of CPMK in an appropriate solvent, such as CCl₄, cyclohexane, n-hexane and others.

By operating under such conditions, the adduct, as it is gradually formed, precipitates in the form of a white powder, which can be collected on a filter and stored for a certain time in a controlled atmosphere, and it can also variously utilized, for example, according to the conditions to be specified hereinafter.

Such a white powdery adduct had the composition CPMK $(SO_2)_n$ in which $1 < n < 4$.

According to another embodiment of the invention, the adduct CPMK/$SO_2$, is obtained by introducing CPMK, either as such or preferably in solution in one of the above indicated solvents, in an amount of liquid $SO_2$, in a quantity in excess with respect to that which is required for the mere formation of the adduct, by operating as a sufficiently low temperature so as to ensure the maintenance of $SO_2$ in the liquid state.

The formation of the adduct can be ascertained and checked from the rapid discharge of the characteristic yellow hue of the CPMK adduct which remains dissolved in the excess of $SO_2$.

By the evaporation of such an excess, the precipitation of the adduct, for example, to the ends of its collection, on a filter, is obtained.

The reaction between the CPMK/$SO_2$ adduct and nitro-sylsuphuric acid can be carried out, with good results, in different solvents, for example, chlorinated solvents, such as carbon tetrachloride and chloroform, saturated hydrocarbons such as pentane, hexane, heptane, cyclical saturated hydrocarbons such as cyclohexane and others.

According to a preferred embodiment of the invention, there is utilized, as a reaction solvent, liquid $SO_2$, by exploiting the twofold capacity of dissolving the adduct and of being a very good solvent of the reaction product thereof with nitrosylsulphuric acid. Such a preferred embodiment is particularly advantageous from a technological standpoint, in that it permits operating with true solutions and thus with the most favourable distribution of the reactants and a convenient transfer of the reaction masses, especially in the case of a continuous-run operation.

In addition, this way of operating, conjointly with the above indicated mode of formation of the adduct by introduction of CPMK in an excess of liquid $SO_2$, permits that an advantageous sequence of operations may be carried out inasmuch as the nitrosation operation can be carried out by introducing the nitrosation mixture in the product which is obtained from the previous operation of formation of the adduct, that is, the solution of the adduct in liquid $SO_2$. In a few cases, the addition of small amounts of AEB may be an asset, preferably at the end of the addition of CPMK and at the same temperatures.

The nitrosation reaction can be carried out by slurrying, with stirring, the adduct in the solvent, preferably the solvent as employed for the preparation of the adduct, as suggested hereinabove, and by adding the nitrosation agent, which reacts with the CPMK/$SO_2$ adduct to form a nitrosated organic solvent which is susceptible of being converted, when appropriate conditions are adopted, into epsilon caprolactam, or into nitrosate precursors thereof. The evolution of the nitrosation reaction can be detected by a conspicuous heat build up and it is preferred to operate by removing the heat excess over that which is necessary to keep the reaction medium at the necessary temperature while avoiding the premature removal of the solvent. By operating in liquid $SO_2$, the nitrosated adduct remains dissolved in the solution, which takes an emerald green hue.

The subsequent treatments directed to the conversion of the nitrosate product into the desired compound or precursor are preferably forerun by the removal of the solvent, more particularly of the liquid $SO_2$ in excess, a removal which can be advantageously carried out by raising the temperature, for example to values in the order of 0°C.

These subsequent treatments are carried out, as a rule, by bringing the system to a temperature having a value comprised between 20°C and 100°C, and maintaining it at such a temperature for the time which is necessary in order than the desired conversion may be obtained. The nitrosyl-sulphoric acid which is employed in the reaction for the formation of the nitrosated product, which is susceptible of subsequent developments towards the formation of the end product or the desired precursor, can be used in its pure crystalline state and, preferably, in a solution in sulphuric acid. In the latter case, the solvent sulphuric acid can be, in turn, either pure or one containing $SO_2$, or water, in solution.

According to a preferred embodiment of the invention, the nitrosation reaction is carried out by employing a nitrosating solution of nitrosylsulphuric acid in sulphuric acid, which contains water, and, more particularly, as exemplified hereinafter.

The foregoing and other more specific features of the invention will become apparent as the ensuing detailed description proceeds of nonlimiting examples of the performance of the method.

The Applicants carried out an extended experimental work for ascertaining and identifying the basic principles and the developments of the invention, as will be specified hereinafter. This experimental work, for obvious reasons, has been carried out by batch processes, with laboratory method and implementation. In addition, the work has been carried out by using, as the starting material, cyclopentamethylene ketene (CPMK) on account of the present predominant interest in the formation of epsilon caprolactam and its procursors, especially cyclohexanone oxime and cyclohexane carboxylic acid, (AEB) as a side product.

For the performance of these tests a glass cylindrical reactor has been used, having a volume of about 800 cubic centimeters, equipped with a jacket adapted to the circulation of cooling and heating liquids.

Such a reactor has a metal frustoconical header of stainless steel, having two pipes for feeding in the reactants, a dipping sheath for introducing a thermometer, a guideway for allowing a passageway for the axle of a stirrer, and two vents for discharging the gases evolved in the reactions.

The inlet tubes were extended so as to reach a distance of about 5 mm from the stirrer, which was of the turbine type, and was actuated by a variable speed motor, up to a speed of 3,000 RPM. In addition, the header had four wave breakers, extended to reach the neighbourhood of the reactor's bottom.

EXAMPLE 1

This example has been specifically reported to demonstrate the possibility of formation of the CPMK/$SO_2$ adduct; the possibility of identification, the nitrosation capability and the possible formation of the desired final and side products.

The reactor, cooled to −20°C, has been charged with a solution of 25.4 grams of CPMK, at the concentration of 97.5 percent (0.2250 mols) in 140 cubic cms. of $CCl_4$. $SO_2$ has been fed until a progressive disappearance of the characteristic yellow hue of CPMK has been ascertained, along with the simultaneous separation of a white powdery adduct, whose composition was $CPMK(SO_2)_n$ wherein $1 < n < 4$.

The reaction mass, vigorously stirred so as to disperse the adduct in the solvent in the most complete possible way, is supplemented, by gradual introduction during 10 minutes while keeping the temperature of the reaction medium at −15°C, with 31.4 grs. of a nitrosating solution in sulphuric acid having the composition by weight:

| | | |
|---|---|---|
| $NOHSO_4$ | = | 60.6% |
| $H_2SO_4$ | = | 32.8% |
| $H_2O$ | = | 6.6% |

The reaction has then proceeded by bringing the entire mass to 0°C during 10 minutes and then by gradually heating, during 5 minutes, up to 75°C by maintaining said temperature for 6 additional minutes. Evolution of $CO_2$ has been experienced.

The reaction mass has then been treated, by adopting the method as described in connection with the examples to follow, to obtain extracts which were composed as follows:

14.70 grs caprolactam (conc. 97 percent)
9.17 grs 98 percent AEB

The result was then that the caprolactam yields were 81.5 percent on CPMK and 84.3 percent on the nitrosation agent. The characteristic molar ratios were:

CPMK/NO = 1.5      free $H_2SO_4$/NO = 0.7
$H_2O$/free $H_2SO_4$ = 1.1

EXAMPLES 2 TO 6

By utilizing the reactor as described previously, a set of tests has been performed, by using a uniform procedure, more particularly as regards the temperature conditions and the times as well as the methods and by limiting, to the ends of a better clarity and completeness of the comparison, the variables to the quantitative and/or proportional values of the added CPMK and the nitrosation solution used. In one of the Examples, and precisely in Example 6, the procedure was such as to obtain a caprolactam precursor, precisely cyclohexanoneoxime. These variables, along with the resultant products, their purity rating and the characteristic ratios, are resumed and associated in the following table, which is accompanied by Notes relative to a few differences as to the additions, the solvents and the final products.

In the reactor, cooled to −20°C, there have been charged 200 cubic cms. of liquid $SO_2$. Separately there is prepared, by drawing the CPMK stored at −40°C and pouring it in the pre-cooled solvent, a solution of CPMK in the quantity, purity and type of solvent as indicated in the Table. The stirrer is started at a rate of 700 RPM and the solution is added dropwise to the $SO_2$ during 5 minutes. During the addition, the temperature of the solution and the reactor is maintained at −20°C by causing a liquid coolant to flow through the reactor jacket.

Owing to the gradual admixture of the CPMK with $SO_2$, the characteristic yellow hue of the ketene is discharged and on completion of the addition, the reaction mass exhibits the appearance of a clear and colourless solution.

On completion of the addition, the temperature of the reactor is brought to −15°C and the dropwise addition of the nitrosating solution is started, in the amount and the composition as shown in the Table for the individual examples. This addition is carried out during 10 minutes, still at the internal temperature of −15°C.

During the addition of the nitrosating solution a tendency towards a temperature rise is noticed, said tendency being checked and counteracted by the circulation of the liquid coolant. On completion of this addition, the reactor mass is perfectly homogeneous and has a green emerald hue.

The excess of $SO_2$ is then removed by bringing the temperature of the reactor to at least 0°C, by feeding properly heated water into the reactor jacket. This removal is completed during a time of 30 minutes.

On completion of the $SO_2$ removal, the temperature of the reactor is brought, during 5 minutes, to 75°C by feeding gradually heated water into the reactor jacket. As this temperature is attained stirring is maintained during 5 additional minutes. A considerable evolution of $CO_2$ is experienced.

The reaction mass is then cooled by feeding ice-cold water into the reactor jacket, whereafter the subsequent treatments are proceeded with which are conducive to the formation of mixtures and solutions from which the residues which are of interest are extracted.

The reaction mass is treated, still in the reactor and with stirring, with 30 cubic cms. of $H_2O$ and then made alkaline to a pH of 9–11, with NaOH in the ratio of 1:1, taking care not to exceed 30°C.

The mixture, formed by the solvent and the resultant alkaline solution, is then quantitatively transferred into a separator funnel having a 1000 cubic cms. capacity and six extractions with $CHCL_3$. The organic extracts are dried over anhydrous sodium sulphate and then evaporated, initially under atmospherical pressures and then under subatmospherical pressures, until the weight is constant.

The residue shows at the infrared analysis, the characteristic caprolactam spectrum (of cyclohexanone oxime in Example 6), in the amounts and purities as analytically determined as shown in the Table.

The alkaline solution is acidified with $H_2SO_4$, in the ratio of 1/1. The acidic solution thus obtained is treated, in turn, by carrying out the same six extractions with $CHCL_3$ and the organic extract is treated in the same way as that extracted from the alkaline solution. The residue, examined chromatographically, proves to be cyclohexanecarboxylic acid (AEB).

The quantitative and qualitative values of the extracts are reported, for the individual examples, in the following Table, along with the characteristic molar ratios.

TABLE

| Variables | Ex. 2 | EX. 3 | EX. 4 | EX. 5 | EX. 6 |
|---|---|---|---|---|---|
| Addition of CPMK | | | | | |
| of purity (%) | 97.5 | (3) 97.5 | 97.5 | (4) 97.5 | 98 |
| by weight Grs. | 25.4 | 25.4 | 17.8 | 25.4 | 22 |
| amount molar | 0.2250 | 0.2250 | 0.1575 | 0.2250 | 0.1960 |
| in cu. cm solvent (1) | 140 | 70 | 140 | 140 | 140 |

TABLE—Continued

| Variables | Ex. 2 | EX. 3 | EX. 4 | EX. 5 | EX. 6 |
|---|---|---|---|---|---|
| Nitrosating solution | | | | (4) | (5) |
| total amount (grams) | 31.4 | 31.4 | 31.4 | 30.3 | 29.6 |
| formed by (% by weight) NOH SO$_4$ | 60.6 | 60.4 | 60.6 | 62.9 | 64.4 |
| H$_2$SO$_4$ | 32.8 | 31.8 | 32.8 | 34.0 | 29.7 |
| H$_2$O | 6.6 | 7.8 | 6.6 | 3.1 | 5.9 |
| Residues | | | | | |
| Caprolactam | | | | | |
| (2) (grams) | 16.2 | 16.1 | 15.0 | 16.8 | 16.6 |
| of purity (%) | 98.0 | 96.5 | 96.8 | 94.3 | 95.0 |
| Hexahydrobenzoic acid (grams) of | 9.8 | 13.8 | 3.0 | 9.6 | 5.7 |
| purity (%) | 98.0 | 98.6 | 98.9 | 98.0 | 97.0 |
| Caprolactam yield (2) (%) | | | | | |
| on CPMK | 93.6 | 90.6 | 95.7 | 88.2 | 91.0 |
| on the nitrosating agent | 93.6 | 91.5 | 85.6 | 93.6 | 93.1 |
| Ratios | | | | | |
| CPMK/NO | 1.5 | 1.5 | 1.05 | 1.5 | 1.3 |
| free H$_2$SO$_4$/NO | 0.7 | 0.69 | 0.7 | 0.7 | 0.6 |
| H$_2$O/free H$_2$SO$_4$ | 1.1 | 1.33 | 1.1 | 1.1 | 2.13 |

Notes:
(1) In all the Examples, CCL$_4$ has been used, with the exception of Example 4 in which n-heptane has been used.
(2) For Example 6, cyclohexanone oxime is to be intended.
(3) upon addition of CPMK, there is added dropwise at −20°C, during 5 minutes, 3.9 grs of 98.5% AEB (0.03 mol) in 70 cu. cms. of CCl$_4$.
(4) upon removal of SO$_2$ there is added, at 0°C, 1.14 grs. of H$_2$O.
(5) there are added 1.7 grs of H$_2$O under the same conditions.

What is claimed is:

1. The method for producing epsilon caprolactam and lactamizable precursors thereof, including cyclohexanone oxime, and cycloaliphatic nitroso derivatives thereof, comprising forming an adduct of cyclopentamethylene ketene (CPMK) and sulfur dioxide (SO$_2$) by contacting CPMK and an amount of liquid SO$_2$ in excess of that required for the formation of said adduct, and subjecting the adduct in said excess of SO$_2$ under reaction conditions to nitrosation with a nitrosating agent to obtain a nitrosated adduct in liquid excess of SO$_2$, and thereafter subjecting the nitrosated adduct in the liquid excess of SO$_2$, under reaction conditions to a temperature between 20°C and 100°C to convert said nitrosated adduct into epsilon caprolactam or a precursor acid thereof, and simultaneously to produce cyclohexanecarboxylic acid.

2. A method according to claim 1, wherein the adduct is formed by introducing the SO$_2$ into a solution of CPMK with simultaneous gradual precipitation and separation of said adduct in the form of a white powder having the composition CPMK (SO$_2$)$_n$ wherein 1<n<4.

3. A method according to claim 1, wherein the adduct is formed by introducing CPMK in solution, in liquid SO$_2$, in an amount in excess with respect to that required for formation of said adduct, a CPMK/SO$_2$ adduct being thus obtained in solution in said excess of liquid SO$_2$.

4. A method according to claim 1, comprising further promoting the adduct nitrosation by placing in mutual contact the adduct in solution and the nitrosation agent.

5. A method according to claim 1, wherein the nitrosating agent is nitrosylsylphuric acid in solution in sulphuric acid.

6. A method according to claim 5, wherein the nitrosating solution contains water.

7. A method according to claim 4 comprising the addition of cyclohexanecarboxylic acid to the solution of the adduct.

8. A method according to claim 3, wherein the excess of liquid SO$_2$ is removed from the solution obtained upon nitrosation and before starting the subsequent reactions and conversions conducive to the formation of the principal and side organic products which are desired.

9. A method according to claim 8, wherein the removal of excess SO$_2$ is effected by raising the temperature of the solution of the nitrosated product above the boiling point of the SO$_2$.

10. A method according to claim 8 comprising adding water to the nitrosated product, before the aforesaid reactions and conversions, and upon removal of the SO$_2$.

* * * * *